(12) United States Patent
Hoppenau et al.

(10) Patent No.: US 10,875,429 B2
(45) Date of Patent: Dec. 29, 2020

(54) CLIMATE CONTROL BY IN-SEAT HUMIDITY SENSOR MODULE

(71) Applicant: SENSIRION AUTOMOTIVE SOLUTIONS AG, Stäfa ZH (CH)

(72) Inventors: Lukas Hoppenau, Stäfa ZH (CH); Michael Gotze, Stäfa ZH (CH); Markus Graf, Stäfa ZH (CH); Pascal Hunziker, Stäfa ZH (CH)

(73) Assignee: SENSIRION AUTOMOTIVE SOLUTIONS AG, Staefa (CH)

( * ) Notice: Subject to any disclaimer, the term of this patent is extended or adjusted under 35 U.S.C. 154(b) by 31 days.

(21) Appl. No.: 16/075,142

(22) PCT Filed: Feb. 3, 2017

(86) PCT No.: PCT/EP2017/052441
§ 371 (c)(1),
(2) Date: Aug. 3, 2018

(87) PCT Pub. No.: WO2017/134255
PCT Pub. Date: Aug. 10, 2017

(65) Prior Publication Data
US 2018/0370400 A1    Dec. 27, 2018

(30) Foreign Application Priority Data
Feb. 3, 2016  (EP) .................................. 16154134

(51) Int. Cl.
*B60N 2/56* (2006.01)
*B60H 1/00* (2006.01)
*A47C 7/74* (2006.01)

(52) U.S. Cl.
CPC .............. *B60N 2/565* (2013.01); *A47C 7/744* (2013.01); *B60H 1/00785* (2013.01);
(Continued)

(58) Field of Classification Search
CPC ........ B60N 2/56; B60N 2/565; B60N 2/5657; B60N 2/5628; B60N 2/5685;
(Continued)

(56) References Cited

U.S. PATENT DOCUMENTS 8,434,314 B2 *  5/2013  Comiskey ............ B60N 2/5635
                                              62/244
2005/0188849 A1 *  9/2005  Yoneno ................ B60N 2/5657
                                              96/143
(Continued)

FOREIGN PATENT DOCUMENTS

DE        10026656        12/2001
DE        10206114         5/2003
(Continued)

*Primary Examiner* — Ryan D Kwiecinski
(74) *Attorney, Agent, or Firm* — JMB Davis Ben-David

(57) ABSTRACT

The invention relates to a sensor module (1), comprising: at least a first sensor (10) that is designed to measure relative humidity and/or temperature, wherein the sensor module (1) is configured to be mounted in an automotive seat (2), which automotive seat (2) comprises a seat cover region (200) forming an outer surface (200a) of the seat that faces a passenger (P) sitting on the automotive seat (2), wherein the sensor module (1) is configured to be mounted such in said automotive seat (2) that it is spaced apart from said seat cover region (200). Further, the invention relates to an automotive seat (2) comprising such a sensor module (1).

9 Claims, 12 Drawing Sheets

(52) U.S. Cl.
CPC ..... *B60H 1/00792* (2013.01); *B60H 1/00807* (2013.01); *B60N 2/5628* (2013.01); *B60N 2/5657* (2013.01); *B60N 2/5685* (2013.01); *B60N 2/5692* (2013.01)

(58) Field of Classification Search
CPC .............. B60N 2/5692; B60H 1/00785; B60H 1/00792; B60H 1/00807; A47C 7/74; A47C 7/742; A47C 7/744; A47C 7/748
See application file for complete search history.

(56) References Cited

U.S. PATENT DOCUMENTS

| | | | |
|---|---|---|---|
| 2005/0200166 A1 | 9/2005 | Noh | |
| 2007/0063551 A1* | 3/2007 | Gasic | B60N 2/5685 297/180.1 |
| 2007/0095378 A1* | 5/2007 | Ito | H01L 35/32 136/203 |
| 2008/0087316 A1* | 4/2008 | Inaba | H01L 35/32 136/204 |
| 2009/0193814 A1* | 8/2009 | Lofy | F28D 15/00 62/3.61 |
| 2010/0130808 A1* | 5/2010 | Hattori | B60H 1/00742 600/9 |
| 2013/0127210 A1* | 5/2013 | Jung | A47C 7/748 297/180.12 |
| 2013/0206852 A1* | 8/2013 | Brykalski | B60N 2/5657 237/2 A |
| 2015/0239321 A1* | 8/2015 | Muller | G01N 19/10 297/180.1 |
| 2018/0118064 A1* | 5/2018 | Sato | B60N 2/5685 |
| 2018/0345753 A1* | 12/2018 | Beloe | B60H 1/00964 |
| 2019/0168646 A1* | 6/2019 | Dragan | A47C 7/74 |

FOREIGN PATENT DOCUMENTS

| | | | | |
|---|---|---|---|---|
| DE | 202019102475 U1 * | 5/2019 | ........... | B60N 2/5635 |
| EP | 2805869 | 11/2014 | | |
| EP | 2910413 | 8/2015 | | |
| EP | 2910413 A1 * | 8/2015 | ............... | B60N 2/58 |
| JP | 2017170983 A * | 9/2017 | | |
| WO | 2009097572 | 8/2009 | | |
| WO | WO-2009097572 A1 * | 8/2009 | ........... | B60N 2/5685 |

* cited by examiner

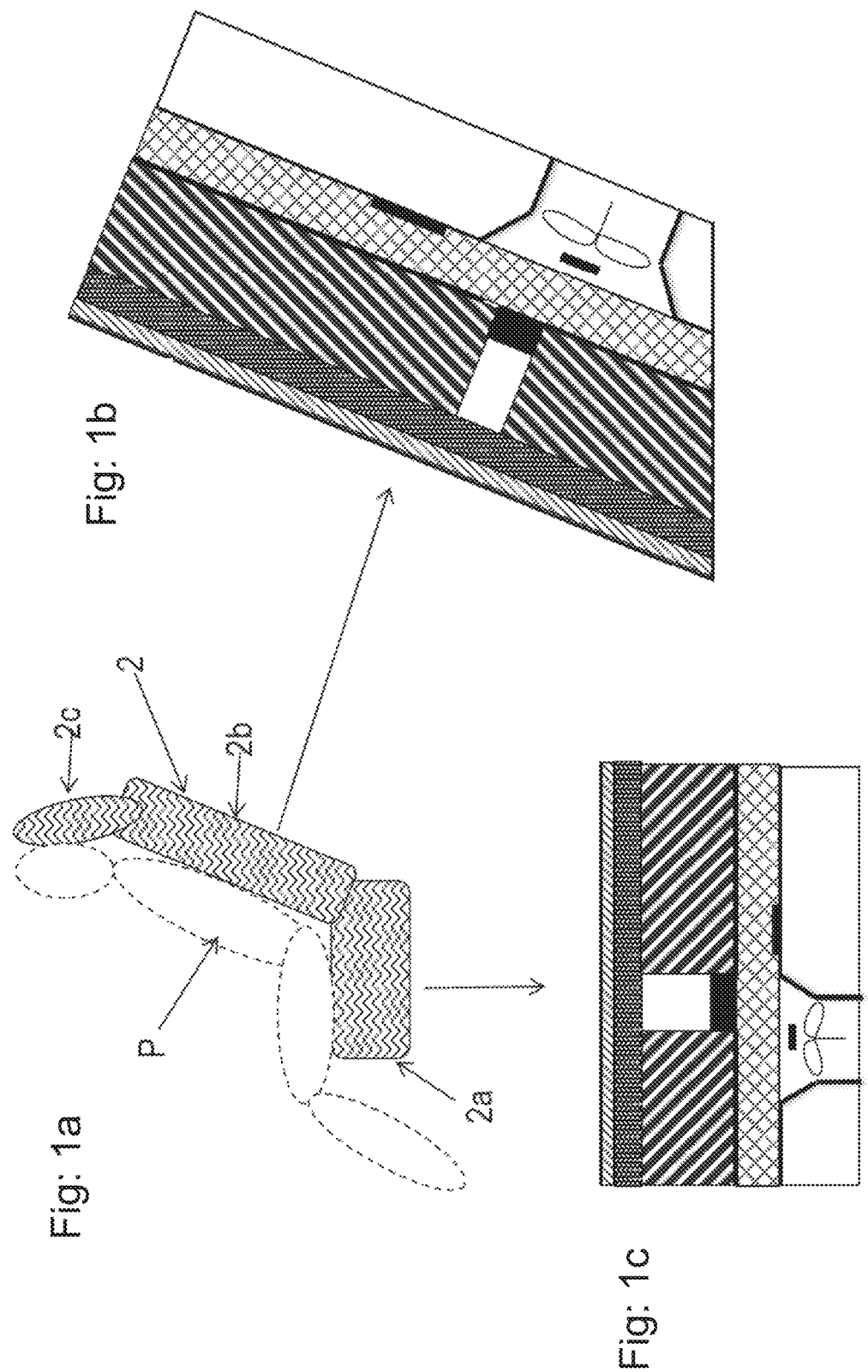

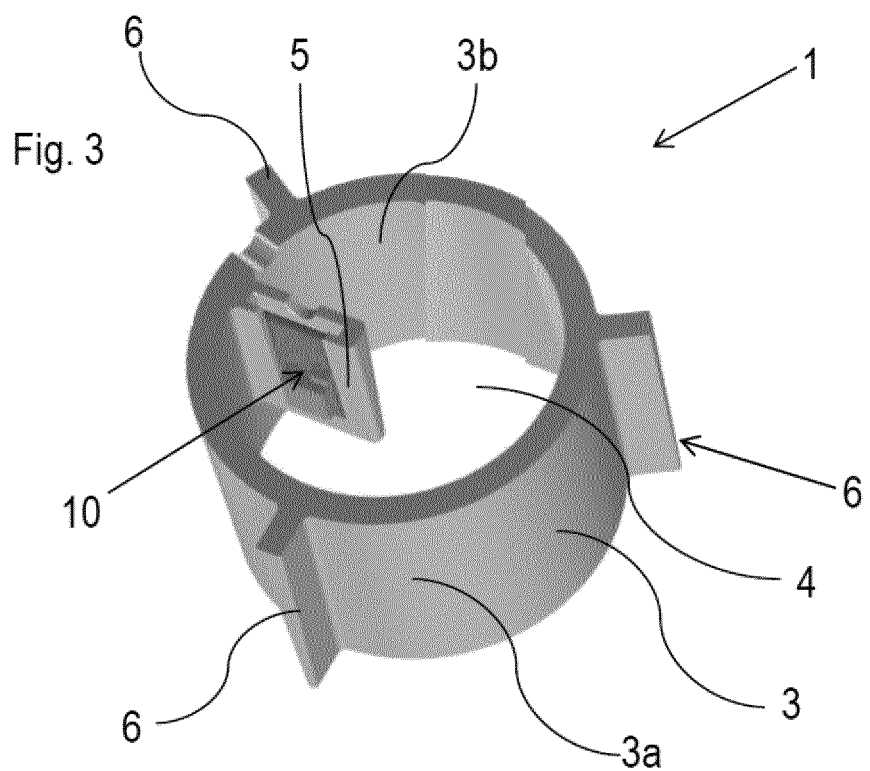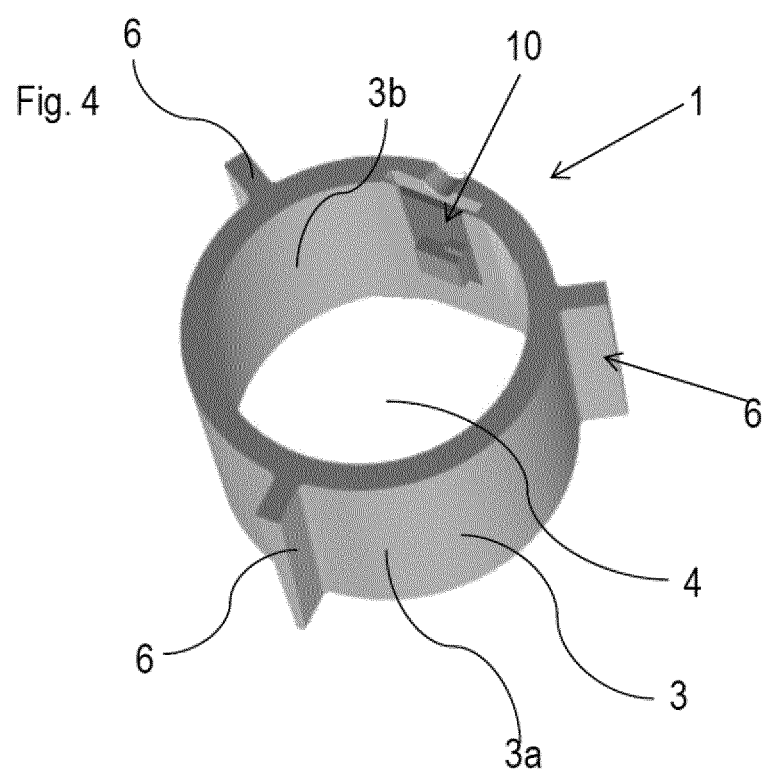

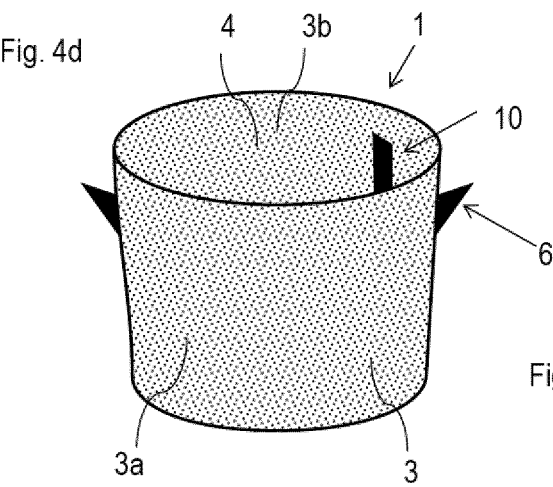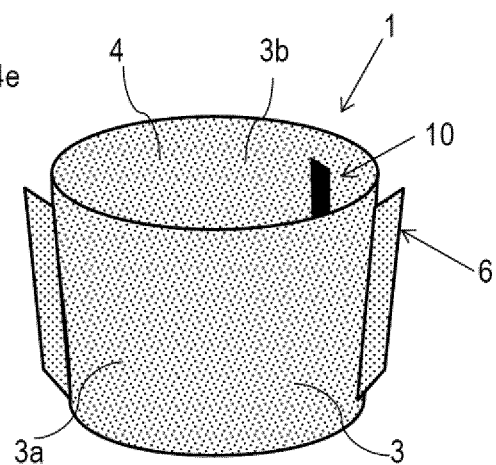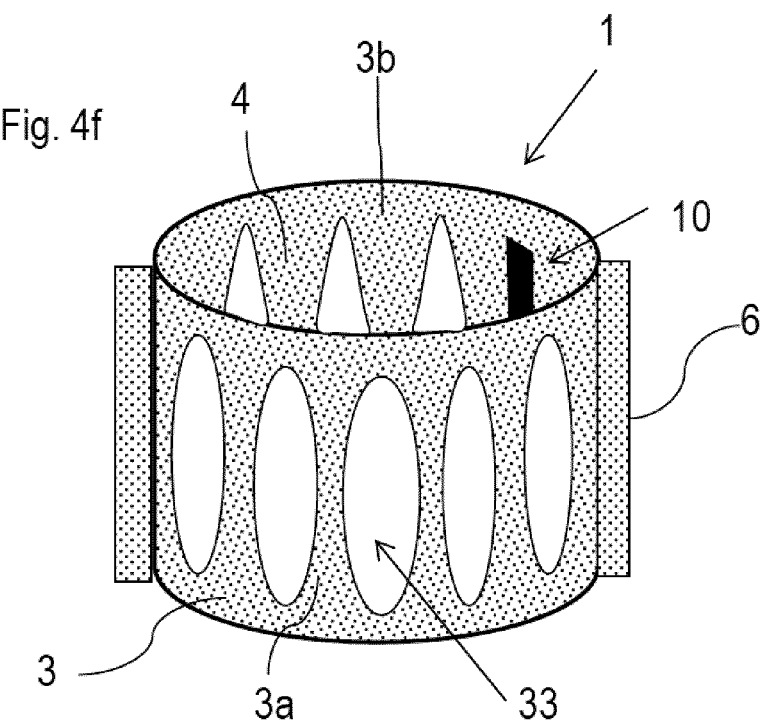

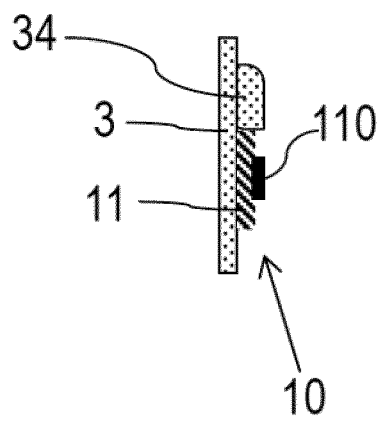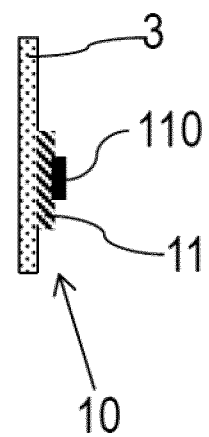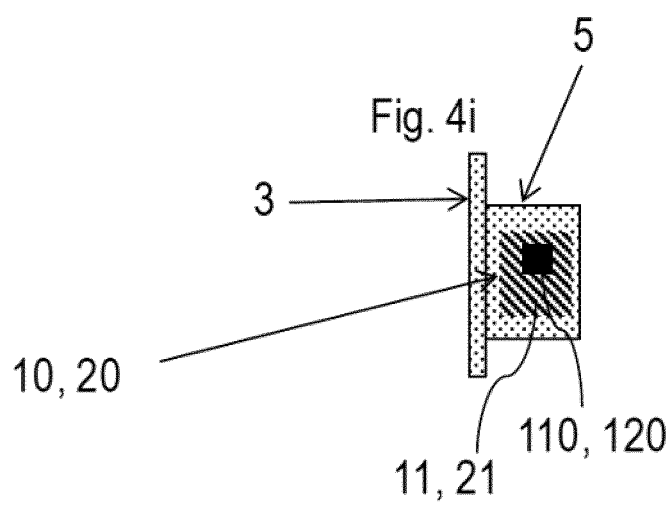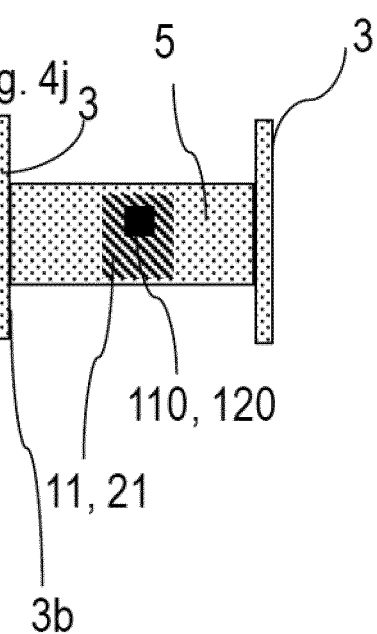

CLIMATE CONTROL BY IN-SEAT HUMIDITY SENSOR MODULE

CROSS-REFERENCE TO RELATED APPLICATIONS

This is the U.S. National Stage of International Patent Application No. PCT/EP2017/052441 filed Feb. 3, 2017, which was published in English under PCT Article 21(2), and which in turn claims the benefit of European Patent Application No. 16154134.7 filed Feb. 3, 2016.

The invention relates to a sensor module, a perspiration sensor as well as to an automotive seat having such a sensor module or perspiration sensor.

A sensor module of the afore-mentioned kind is for instance disclosed in EP 2 910 413 A1.

A main challenge for integrating modules for measurement of temperature and/or relative humidity in an automotive seat is the goal that such a sensor module shall not decrease the seating comfort of the passenger occupying the respective seat. Seating comfort is immediately decreased when stiff objects are in contact with the passenger. This poses a significant problem for sensor modules that are configured for measuring temperature and/or relative humidity: The closer the sensor module is located to the surface of a seat the higher the likelihood that it causes seating discomfort for the passenger.

Based on the above, the problem underlying the present invention is to provide a sensor module as well as an automotive seat comprising such a sensor module, which sensor module and seat allow to overcome the above-stated difficulties.

This problem is solved by a sensor module as well as by a perspiration sensor, as well as by an automotive seat. Preferred embodiments of these aspects of the present invention are stated in the corresponding sub claims and are described below.

The sensor module comprises at least a first sensor that is designed to measure relative humidity and/or temperature, wherein the sensor module may be configured to be mounted in an automotive seat, which automotive seat comprises a seat cover region forming an outer surface of the seat, which outer surface faces (e.g. contacts) a passenger sitting on the automotive seat, wherein the sensor module is configured to be mounted such in said automotive seat that it is spaced apart from said seat cover region (as well as from said outer surface), particularly such that it is not sensible by the passenger that is sitting on the seat and/or rests against a backrest of the seat.

Particularly, said outer surface is a visible surface of the seat (e.g. of a seat bottom or of backrest of the seat), wherein the person using the seat contacts said outer surface while sitting on the automotive seat.

Due to the invention, the comfort of the passenger can be significantly increased by moving the sensor module further away from the outer seat surface as proposed herein. This also improves reliability of the sensor module due to the fact that the sensor is less subject to forces induced by the passenger.

According to an embodiment of the sensor module according to the invention, the sensor module comprises a circumferential wall that surrounds a channel (particularly for guiding air) of the sensor module, wherein said first sensor is arranged in said channel.

Particularly, said circumferential wall comprises a tubular shape, particularly a hollow (e.g. circular) cylindrical shape.

Further, according to an embodiment of the sensor module according to the invention, the first sensor is attached to an inside of said wall, wherein particularly the first sensor is arranged in a recess formed in said inside. Alternatively, the first sensor is attached to a holding element that protrudes from said inside of said wall into said channel so that the first sensor is arranged closer or even in the center of said channel. The holding element can be integrally formed with the wall.

Further, according to an embodiment of the sensor module according to the invention, the sensor module comprises at least one semi-conductor chip configured to measure said relative humidity and/or temperature, particularly a CMOS chip, which chip is particularly mounted on a carrier, e.g. a flat substrate (such as a printed circuit board abbreviated as PCB), that may extend along an extension plane. Particularly, when the first sensor is attached to said inside of said wall, a front side of said carrier (e.g. flat substrate) faces said channel while the back side of the carrier faces outwards away from the channel, e.g., the extension plane of the carrier essentially extends tangentially or parallel to the inside of the circumferential wall.

Further, particularly, the carrier or substrate or first sensor may be embedded into said inside of the wall. Particularly, the first sensor may be arranged in a form-fitting manner in a recess formed in said inside of the wall, such that said back side faces and/or contacts said wall and such that said front side faces the channel. The first sensor may however also be attached to the wall by means of glueing, by means of a molding process, or by another suitable fastening means (the same holds for the second sensor described below)

Further, particularly, when the first sensor is attached to said holding element, the extension plane of the carrier or substrate may extend in the axial direction as well as in the radial direction of said wall, e.g., the extension plane or carrier (e.g. substrate or PCB) extends perpendicular to a peripheral direction of said wall. Also here, the first sensor may be embedded into said holding element protruding from the inside of said wall and may be particularly arranged in a form-fitting manner in a recess formed in said holding element.

Further, the at least one chip is preferably mounted (e.g. soldered) to the front side of the carrier or substrate, but may also be mounted (e.g. soldered) to the back side of said carrier or substrate. Further, said carrier or substrate may be a printed circuit board according to an embodiment of the present invention.

Further, according to an embodiment of the sensor module according to the invention, the sensor module comprises a second sensor that is designed to measure relative humidity and/or temperature, wherein said second sensor is arranged in said channel, wherein the first sensor is attached to the inside of said wall (which inside faces said channel), and wherein the second sensor is attached to a holding element that protrudes from said inside of said wall into said channel.

Further, according to an embodiment of the sensor module according to the invention, the sensor module comprises at least one fastening element which protrudes from an outside of said wall, wherein said at least one fastening element is configured to engage in a form-fitting manner with a recess in a filling material, particularly a foam or fiber layer, of the automotive seat which filling material may surround said wall of the sensor module.

Furthermore, in an embodiment, the sensor module may comprises a circumferential fixture, particularly in the form of a flange, that protrudes in a radial direction from an end of said circumferential (first) wall of the sensor module and is designed to butt against a surface of a material surrounding an opening to an air duct of the seat into which the wall is to be inserted. Here, the fixture acts as a stop that prevents further insertion of the wall into said air duct. Advantageously, this embodiment allows for a reproducible positioning of the sensor module with respect to the surrounding seat material.

Furthermore, according to an embodiment, the sensor module may comprise a second circumferential wall having a circumferential fixture at an end of the second wall, too. Here, this second wall is preferably designed to slide back and forth on the first wall. Here, the second fixture is designed to butt against a second surface of said material of the seat that surrounds a second opening to said air duct of the seat. Particularly, the second wall is designed to be inserted into said air duct from a side facing away from said first surface described above until the second fixture butts against said second surface. In this way, the second fixture also forms a stop that prevents further insertion of the second wall into the air duct.

Due to the fact that the second wall is designed to slide over the first wall, the sensor module is designed to compensate a deformation/compression of said material of the seat in which the air duct is formed when a passenger takes place on the seat.

Further, according to an embodiment of the present invention, the circumferential wall may also be tapered in the insertion direction so that the wall can be inserted into an air duct with the tapered head ahead. Here, the fastening means described above that protrude from an outside of the wall may be formed as barbed hooks, so as to anchor the wall in the respective air duct or recess.

Furthermore, in an embodiment of the sensor module according to the invention, the circumferential wall may comprise a plurality of lateral openings (e.g. in the form of slits).

Furthermore, in certain embodiments, the sensor module may also comprise a rigid or a flexible carrier for carrying the temperature/relative humidity sensor (e.g. its chip. particularly CMOS chip) that is configured to be attached to the seat by means of sewing and/or gluing.

Further, according to an embodiment of the sensor module according to the invention, the sensor module comprises a fastening means being configured to fasten the first sensor to a ventilator, which ventilator comprises an opening or defines a region, wherein the ventilator is configured to eject air out of the opening or region or to suck air into the opening or region, which opening extends along an opening plane, wherein said axis of the ventilator runs perpendicular to said opening plane or region, and wherein said fastening means is configured to fasten the first sensor to the ventilator such that the first sensor is arranged on said axis of the ventilator in front of said opening or region.

Further, according to an embodiment of the sensor module according to the invention, the fastening means comprises a plurality of arms designed to extend from the first sensor to the ventilator, which arms are configured to engage, particularly engage behind, the ventilator for fasting the first sensor to the ventilator.

Further, according to an embodiment of the sensor module according to the invention, the fastening means is designed such that the first sensor is spaced apart from the ventilator (i.e. from said opening of the ventilator) when the first sensor is fastened to the ventilator by means of the fastening means.

Particularly, according to an embodiment, the fastening means may be designed such that the extension plane of the carrier or substrate is arranged perpendicular to the axis of the ventilator or parallel to said axis when the first sensor is fastened to the ventilator by means of the fastening means.

Furthermore, according to yet another aspect of the present invention, a perspiration sensor is disclosed which comprises a sensor module according to the invention having a first and a second sensor for measuring perspiration. Here the first and the second sensor are preferably configured to measure relative humidity and particularly also temperature. Particularly, using relative humidity and temperature measured by the first sensor and measured by the second sensor, absolute humidity values can be computed at the first sensor and at the second sensor from which a perspiration rate can be computed (see also below).

Furthermore, according to an embodiment, the perspiration sensor comprises a control unit that is configured to determine a perspiration rate, particularly of a passenger occupying the automotive seat, using a relative humidity measured by the first sensor and a relative humidity measured by the second sensor, and particularly also using a temperature measured by the first sensor as well as a temperature measured by the second sensor.

Particularly, the control unit can be comprised by the sensor module, e.g., can be an integral part of the sensor module. Alternatively, the control unit can be formed separately with respect to the sensor module (i.e. forms an external control unit with respect to the sensor module). Here, said separate/external control unit may be connected to the sensor module (e.g. via a suitable line or a wireless connection) for communication purposes and is configured to determine said perspiration rate (see above).

Particularly, the first sensor is configured to generate a sensor signal indicative of the relative humidity and particularly temperature measured by the first sensor, and the second sensor is configured to generate a sensor signal indicative of the relative humidity and particularly temperature measured by the second sensor. Further, particularly, the control unit is configured to receive said signals and to determine a perspiration rate using said sensor signals of the first and second sensor.

Further, according to an embodiment, said channel of the sensor module ends in an opening (e.g. at a face side of said wall of the sensor module), wherein particularly said opening is configured to be arranged in flow communication with a body part of a passenger occupying said automotive seat, and wherein the first sensor is arranged in the channel at a first distance from the opening, and wherein the second sensor is arranged at a second distance from the opening, wherein the second distance is larger than the first distance.

Particularly, due to such a configuration/arrangement of the sensor module a flux of vapour (particularly due to diffusion) in the form of sweat that escapes from said body part of said passenger can be sensed by the first and the second sensor, wherein when said opening is in flow communication with said body part of the passenger, the first sensor will see an increased absolute humidity value compared to the second sensor, which difference can be used to determine/measure a perspiration rate.

One main mechanism for thermoregulation of the human body is perspiration: Sweat is produced in sweat glands and is transported to the skin surface where it evaporates. This flux of sweat removes heat from the human body. The perspiration rate J describes the rate of sweat transported to the skin surface (Unit: $g/(h*m^2)$).

Particularly, the control unit is configured to determine as perspiration rate J a value given by the relation:

$$J = -D(T) \frac{AH_2 - AH_1}{d_{seperation}}$$

$$AH = \frac{m_{H_2O}}{V} = \frac{M_{H_2O} * n}{V} = M_{H_2O} * \frac{p_{H_2O}}{R*T}$$

$$p_{H_2O} = \frac{RH}{100} * p_{sat,H2O}(T)$$

wherein $AH_1$ is the absolute humidity at the first sensor and $AH_2$ is the absolute humidity at the second sensor (in the line below, AH stands for both absolute humidities, wherein the pressure $p_{H2O}$ calculated from relative humidity RH and $p_{sat,H2O}(T)$ at the respective (first or second) sensor has to be considered).

Furthermore, $d_{seperation}$ is the distance between the first and the second sensor, and D(T) is a temperature dependent diffusion constant.

Further, in the above equations, the following quantities are used:
 $m_{H2O}$: Mass of water molecules,
 V: Volume,
 $M_{H2O}$: Molecular weight of water molecule 18.015 gram/mol,
 n: number of water molecules in mol, wherein by the ideal gas law one has $p*V=n*R*T$,
 $p_{H2O}$: partial pressure of water molecules,
 R: universal gas constant 8.314472 [Joule/mol/Kelvin],
 T: temperature in Kelvin=273.15° C.+$T_{sensor}$
 RH: Relative humidity in percent,
 $P_{sat,H2O}(T)$: Saturation pressure of water at given temperature T.

Thus, in this approach particularly, besides constants that can be stored in a lookup table, only relative humidity and the temperature needs to be known in the vicinity of the respective sensor (first or second sensor), which can be measured by the respective sensor.

Furthermore, the constants for calculating an accurate perspiration rate value are characteristic of the sensor arrangement and structure of the sensor module. Depending on the accuracy level, these constants are determined in a calibration step, and are particularly either representative for a certain device type or an individual sensor module.

Particularly, according to an embodiment, the control unit is configured to generate a control signal using said measured perspiration rate, which control signal may be indicative of said perspiration rate or may depend on the latter, for controlling a ventilator of an automotive seat and/or an automotive air conditioning system (A/C).

According to yet another aspect of the present invention, an automotive seat having a ventilator and a sensor module or perspiration sensor according to the present invention is disclosed, wherein the control unit of the sensor module/perspiration sensor is configured to generate a control signal using said measured perspiration rate (which control signal may be indicative of said perspiration rate or may depend on the latter) for controlling said ventilator.

Particularly, said opening of the sensor module in which said channel ends is arranged such that it is in flow communication with a body part of a passenger occupying said automotive seat, wherein the first sensor is arranged in the channel at a first distance from the opening, and wherein the second distance is arranged at a second distance from the opening, wherein the second distance is larger than the first distance.

According to yet another aspect of the present invention, an automotive air conditioning system for climate control in a cabin of a motor vehicle (e.g. for adjusting temperature and/or relative humidity in said cabin) is disclosed, having a sensor module according to the invention, wherein the control unit of the sensor module is configured to generate a control signal using said measured perspiration rate (which control sensor may be indicative of said perspiration rate or may depend on the latter) for controlling said automotive air conditioning system (e.g. for controlling temperature and/or relative humidity in said cabin).

According to a further aspect of the present invention, an automotive seat, also denoted as climate seat.

According thereto, the automotive seat comprises a sensor module or perspiration sensor according to the invention as well as a seat cover region (see also above) forming an outer surface of the seat that faces a passenger sitting on the automotive seat, wherein the sensor module is mounted such in said automotive seat that it is spaced apart from said seat cover region as well as said outer surface, particularly such that it cannot be sensed by the passenger and is particularly not subject to deformations due to the passenger taking place or sitting on the automotive seat.

According to an embodiment of the automotive seat according to the invention, the automotive seat comprises a filling material, particularly in the form of a foam or a fiber layer (or some other suitable material), arranged below said seat cover region, which filling material comprises a recess forming an air duct.

Further, according to an embodiment of the automotive seat according to the invention, the automotive seat comprises a spacer material, particularly in the form of an air distribution layer, arranged below the filling material and in flow connection to said air duct.

Further, according to an embodiment of the automotive seat according to the invention, the automotive seat comprises a further air duct being in flow connection to said air duct in the filling material, particularly via the spacer material (e.g. said air distribution layer), wherein the automotive seat comprises a ventilator configured to force air through said further air duct towards and/or away from said seat cover region. Particularly, said ventilator may be configured as described above. Particularly, the ventilator is configured to transport air from the passenger to the sensor module where said air is measured.

Further, according to an embodiment of the automotive seat according to the invention, the sensor module is arranged in said air duct of the filling material. Here, preferably, the sensor module is formed according to one of the above-described embodiments where the sensor module comprises said circumferential wall. Here, the outer side of the wall may contact the inside of the air duct in a form-fitting manner (see also above).

Further, according to an embodiment of the automotive seat according to the invention, the sensor module is arranged in said spacer material (e.g. in said air distribution layer).

Further, according to an embodiment of the automotive seat according to the invention, the sensor module is arranged in said further air duct. Here, preferably, the sensor module is formed according to one of the above-described embodiments where the sensor module comprises said fastening means for fastening the first sensor to the ventilator.

Further, according to an embodiment, said opening of the sensor module in which the channel ends is arranged such that it is in flow communication with a body part of a passenger when said passenger occupies said automotive seat.

Further embodiments, features and advantages of the present invention will be described below with reference to the Figures, wherein FIGS. 1a to 1d show a schematical cross-sectional view of an automotive seat according to the invention, particularly a part of a seat bottom or of a backrest of the seat, wherein the seat comprises a sensor module according to the invention;

FIG. 3 shows a perspective view of a further embodiment of a sensor module according to the invention, comprising a single (first) sensor for measuring relative humidity and/or temperature;

FIG. 4 shows a perspective view of another embodiment of a sensor module according to the invention, comprising a single (first) sensor for measuring relative humidity and/or temperature;

FIG. 4d shows a perspective view of a further embodiment of a sensor module comprising a surrounding wall and fastening means attached thereto;

FIG. 4e shows a perspective view of a further embodiment of a sensor module comprising a surrounding wall and fastening means attached thereto;

FIG. 4f shows a perspective view of a further embodiment of a sensor module comprising a surrounding wall having a plurality of recesses;

FIGS. 4g and 4h show possible details of the first sensor of the sensor module shown in FIGS. 2 to 4f;

FIGS. 4i and 4j show possible details of the first sensor of the sensor module shown in FIG. 3;

Figure 9A:
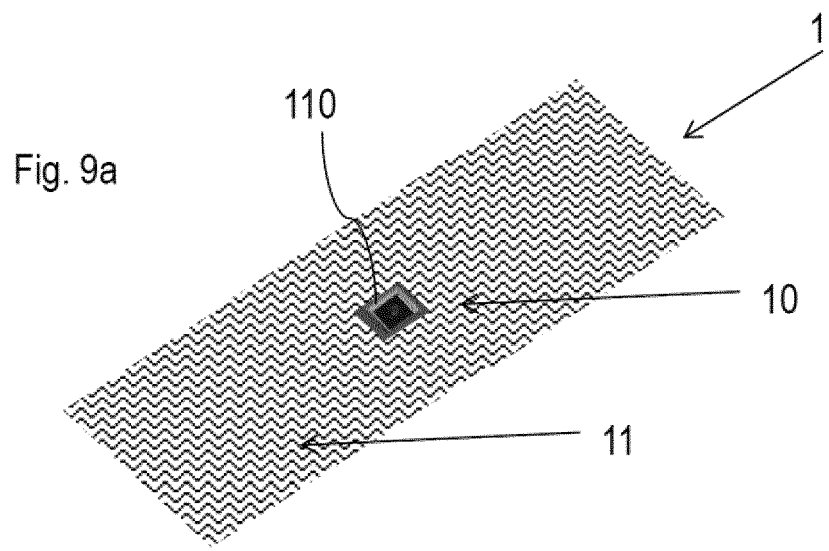
Figure 9B:
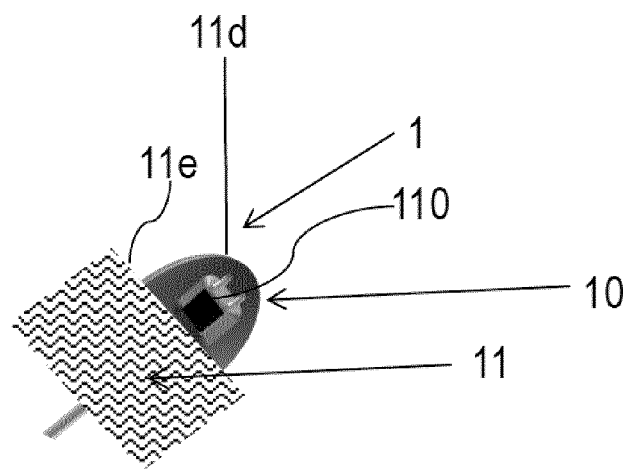
Figure 10:
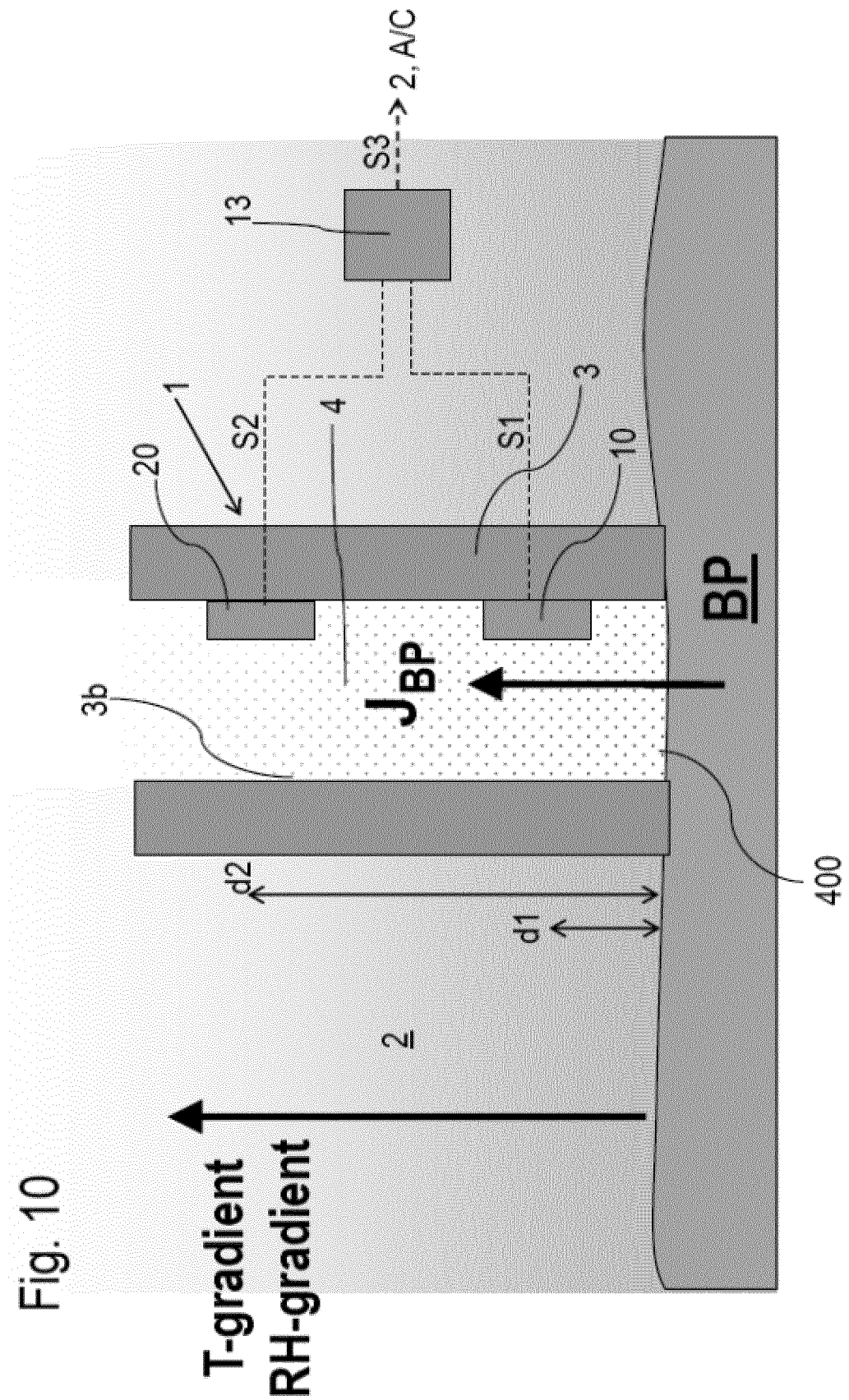
Figure 11:
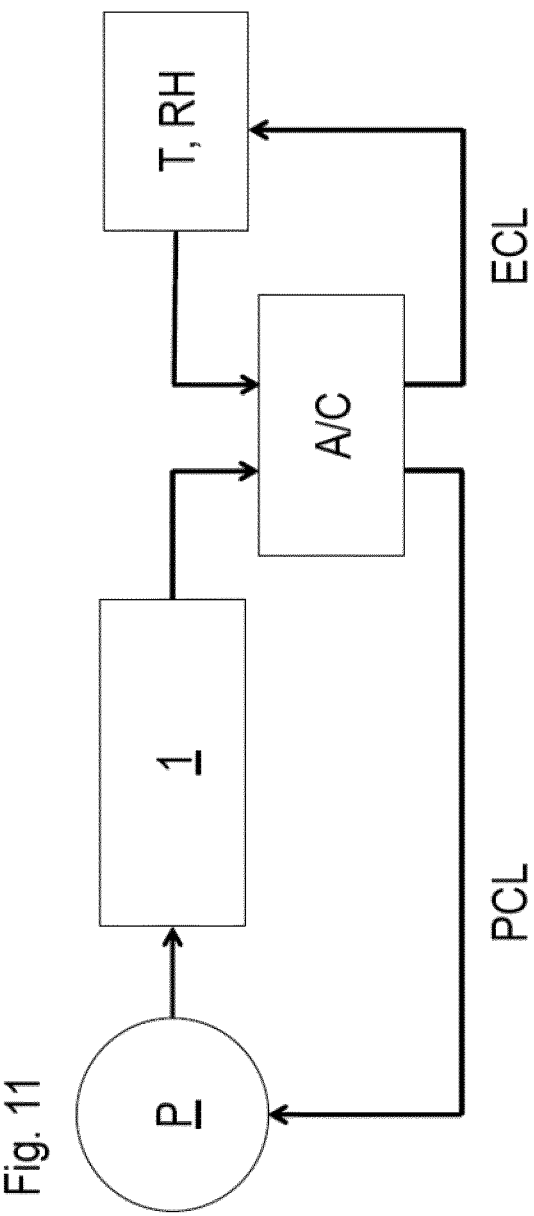
Figure 12:
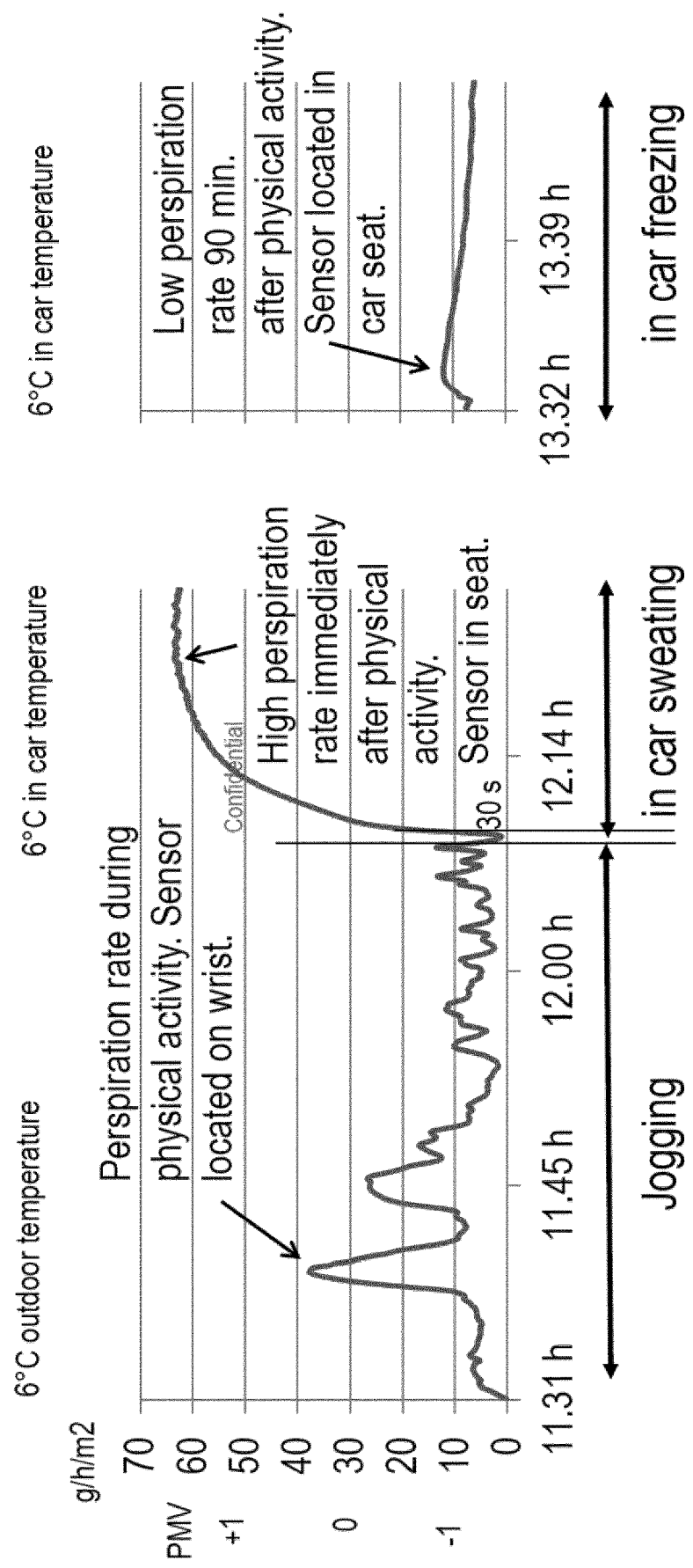

FIG. 9a shows a schematic view of a further embodiment of a sensor module according to the invention, FIG. 9b shows a modification of the embodiment shown in FIG. 9a, FIG. 10 shows a sensor module according to the present invention for measuring perspiration, FIG. 11 shows an automotive air conditioning system using a sensor module according to FIG. 10; and FIG. 12 illustrates perspiration rates of a passenger that enters a car after physical activity.

Figure 1D:
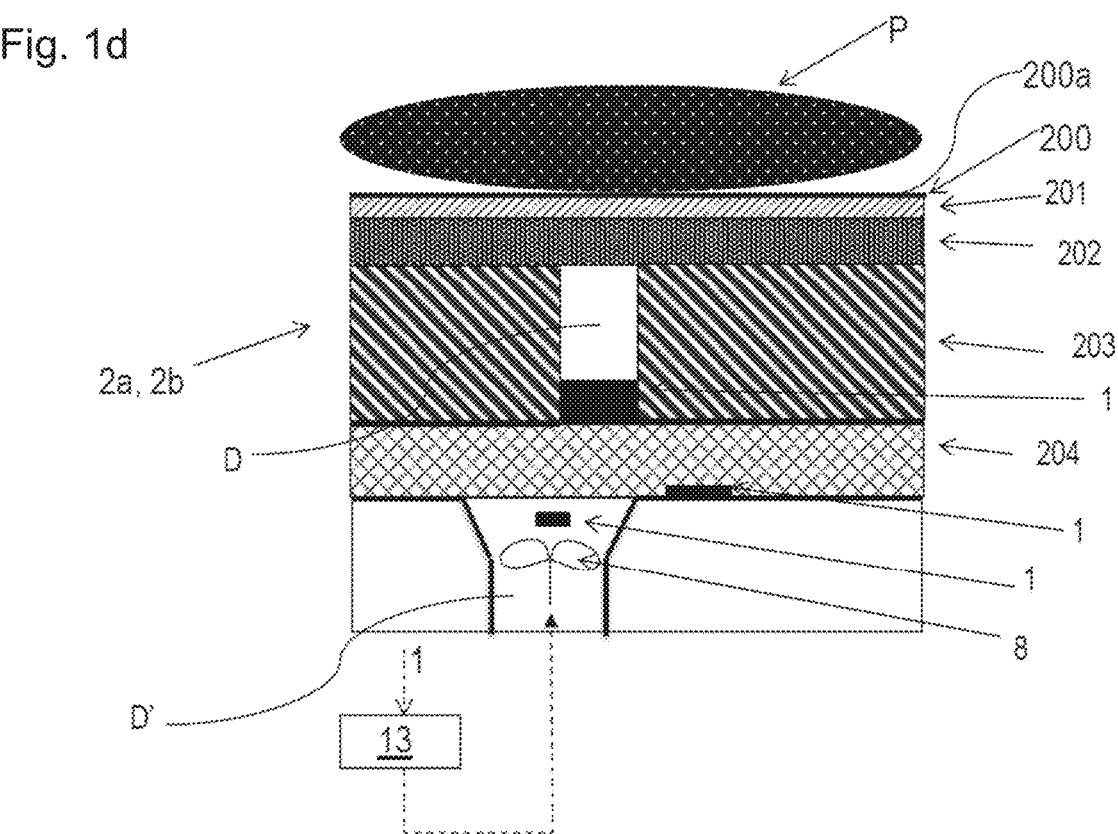

The present invention relates to a sensor module 1 comprising at least a first sensor 10 that is designed to measure relative humidity and/or temperature. Such a sensor may be a sensor of the SHT series available from Sensirion AG, Stafa, Switzerland. Furthermore, the sensor module 1 is configured to be mounted in an automotive seat 2 as exemplary shown in FIGS. 1a to 1d, which automotive seat 2 comprises a seat cover region 200 (e.g. comprising an air permeable layer, for instance a thin sheet of a perforated leather) forming an outer surface 200a of the seat 2 that faces a passenger P sitting on the automotive seat 2, wherein the sensor module 1 is configured to be mounted such in said automotive seat 2 that it is spaced apart from said seat cover region 200. Here, said seat cover region 200 may belong to a seat cushion 2a (also denoted as seat bottom), but may also be part of a backrest 2b of the vehicle seat 2 as indicated in FIG. 1d.

FIGS. 2 to 9b show different embodiments of the sensor module 1 according to the invention.

Figure 2:
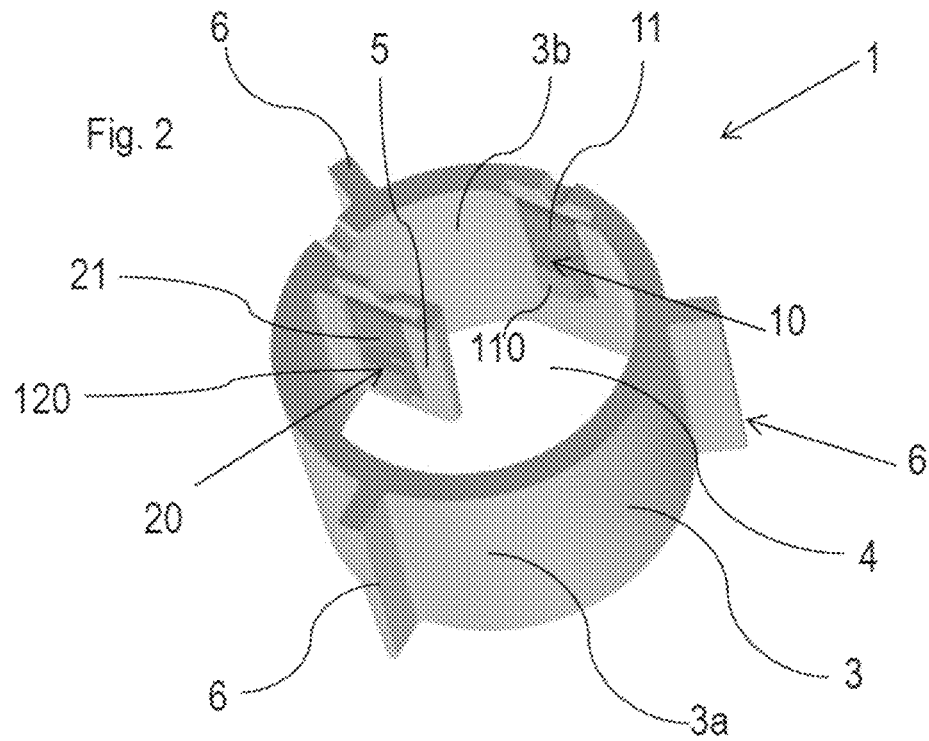
FIG. 2 shows a perspective view of an embodiment of a sensor module according to the invention comprising a first and a second sensor for measuring relative humidity and/or temperature, respectively.

According to FIG. 2, the sensor module 1 may comprise a circumferential wall 3, e.g. of a tubular shape, which wall 3 serves for housing a first and a second sensor 10, 20 each being configured to measure relative humidity and/or temperature.

As can be seen from FIG. 3, the first sensor 10 is attached with its carrier (e.g. a PCB or another suitable substrate) 11 carrying a (e.g. CMOS) chip 110 of the first sensor 10 to an inside 3b of the wall 3, particularly by insertion into a recess formed in said inside 3b of the wall 3 or by means of another suitable fastening means. In contrast thereto, the second sensor 20 is attached to a holding element 5 which may be formed integrally with the wall 3 and protrudes from said inside 3b in a radial direction towards a center of the channel 4 formed by the circumferential wall 3. Also here, a carrier (e.g. a PCB or another suitable substrate) 21 of a (e.g. CMOS) chip 120 of the second sensor 20 may be inserted into a recess formed in the bolding element 5 in order to fasten the second sensor 20 to the holding element 5/wall 3. Also here, alternative fastening means are conceivable.

FIGS. 3 and 4 show modifications of the embodiment according to FIG. 2, wherein in FIG. 3 merely a single (first) sensor 10 is present that is fastened to the wall via said holding element 5, while in FIG. 4 merely a single (first) sensor 10 is present that is attached to the inside 3b of the wall as shown in FIG. 2.

Particularly, regarding FIGS. 2 to 4, positioning the first or second sensor 10, 20 closer to the center of the channel 4 using e.g. said holding element 5 has the advantage that the first or second sensor 10, 20 are closer to the main flow of air through channel 4 and comprise a smaller thermal coupling to the wall 3/seat 2. On the other hand, placing the first or second sensor 10, 20 closer to the wall 3 has the advantage of reducing noise since the sensors 10, 20 are then arranged away from the central main flow and cause less turbulence in the channel 4.

Figure 4B:
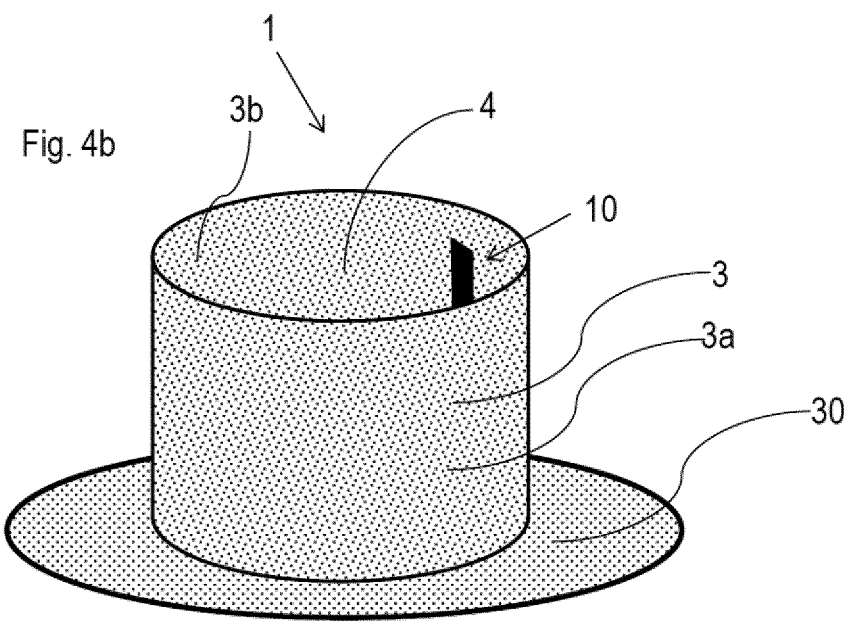
FIG. 4b shows a perspective view of another embodiment of a sensor module having a surrounding wall.

FIG. 4b shows a further embodiment of a sensor module 1 according to the present invention, wherein the sensor module 1 comprises a circumferential, particularly tubular, wall 3 that encloses a channel 4 of the sensor module 1, wherein a first sensor 10 for measuring temperature and/or relative humidity is attached to an inside 3b of said wall 3 facing said channel 4. The first sensor 10 can be attached to said inside 3b as described above.

Furthermore, the sensor module 1 according to FIG. 4b comprises a circumferential fixture 30, particularly in the form of a flange, that protrudes in a radial direction from an end of said wall 3 and is designed to butt against a surface of a material (e.g. filling material 203) surrounding an opening to an air duct D or D' of the seat 2 (see also below).

Thus, when the wall 3 is inserted into a recess (e.g. an air duct D or D', see also below), the fixture 30 acts as a stop that prevents further movement of the wall 3 into said recess/air duct D or D'. Thus, advantageously, this embodiment allows for a reproducible positioning of the sensor module 1 with respect to the seat 2.

Figure 4C:
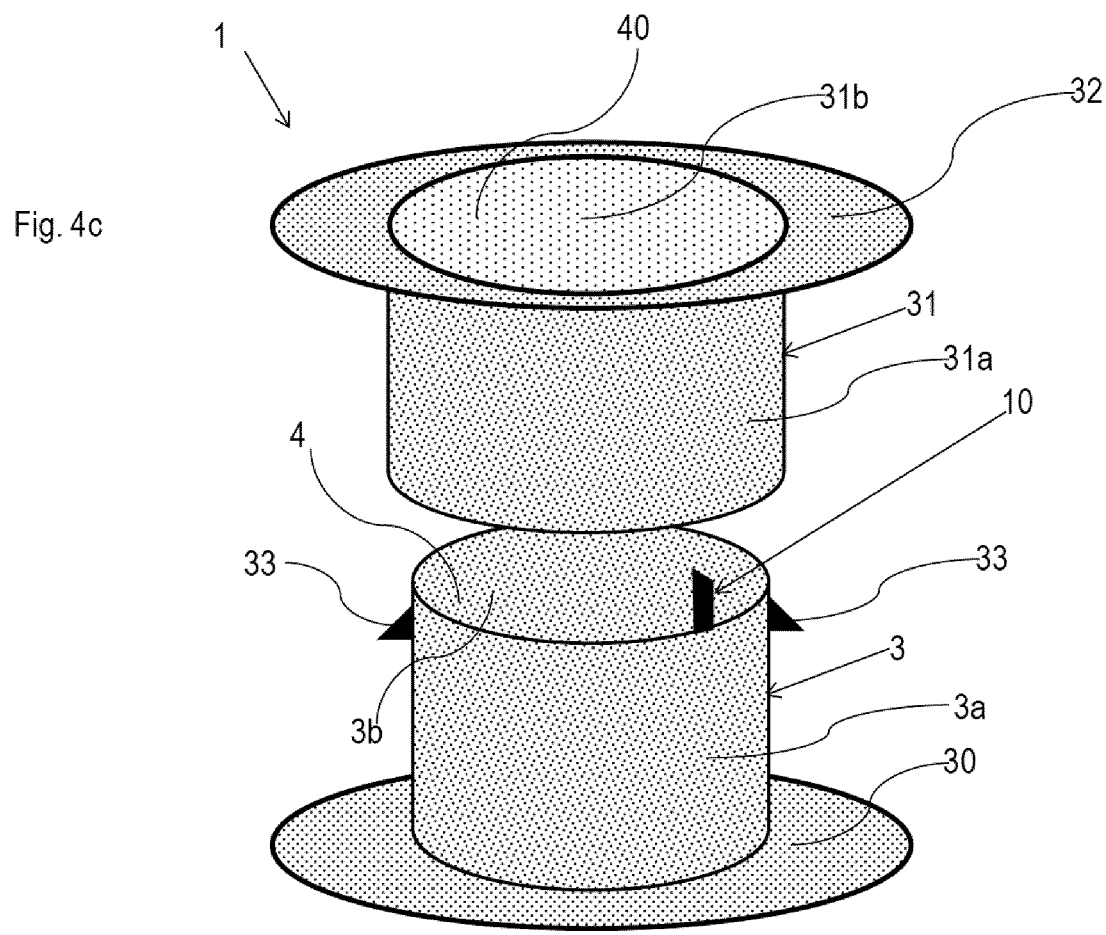
FIG. 4c shows a perspective view of a modification of the embodiment shown in FIG. 4b.

FIG. 4c shows a modification of the embodiment shown in FIG. 4b. Here the sensor module 1 comprises, as particularly described with reference to FIG. 4b, also a circumferential, particularly tubular, first wall 3 that encloses a first channel 4, wherein a (first) sensor 10 for measuring temperature and/or relative humidity is attached to an inside 3b of said first wall 3 facing said channel 4. The sensor 10 can be attached to said inside 3b as described above.

Furthermore, the sensor module 1 according to FIG. 4c comprises a circumferential first fixture 30, particularly in the form of a first flange, that protrudes in a radial direction from an end of said first wall 3 and is designed to butt against a first surface of a material (e.g. filling material 203) of the seat 2 surrounding a first opening to an air duct D of the seat 2 (see also below), wherein the first wall 3 is again designed to be inserted into said air duct D until the first fixture 30 butts against said surface.

In contrast to FIG. 4b, the sensor module 1 now comprises a second circumferential wall 31 in addition, which comprises an outside 31a and an inside 31b and encloses a second channel 40, wherein a second circumferential fixture 32, particularly in the form of a second flange, protrudes in a radial direction from an end of said second wall 31.

Here, the second wall 31 is designed to slide back and forth on the first wall 3 (i.e. the first wall 3 moves/slides inside the second channel 40), wherein guiding means 33 preferably protrude from the outside 3a of the first wall 3 in a radial direction in order to position the second wall 31 with respect to the first wall 3 in a direction perpendicular to said sliding movement. When the second wall 31 is arranged on the first wall 3, the inside 31b of the second wall 31 faces the outside 3a of the first wall 3.

Similar to the first fixture 30, the second fixture 32 is designed to butt against a second surface of said material (e.g. filling material 203) of the seat 2 surrounding a second opening to said air duct D of the seat 2 (see also below), which second opening faces the first opening. Particularly, the second wall 31 is designed to be inserted into said air duct D from a side facing away from said first surface until the second fixture 32 butts against said second surface. In this way, the second fixture 32 also forms a stop that prevents further insertion of the second wall 32 into the air duct D.

Due to the fact that the second wall 31 is designed to slide over the first wall 3, the sensor module 1 is designed to compensate a deformation/compression of said material (e.g. filling material 203) in which the air duct D is formed due to a passenger sitting on the seat 2.

FIGS. 4d and 4e show a further embodiment of a sensor module 1 comprising a circumferential (e.g. tubular) wall 3 enclosing a channel 4, wherein again a sensor 10 for measuring temperature and/or humidity is attached to an inside 3b facing said channel 4.

The circumferential walls 3 are configured to be inserted into a recess in a material of the seat 2 (i.e. into the filling material 203 and/or into an air duct D) wherein the walls 3 are tapered in the axial direction that corresponds to the insertion direction and are configured to be inserted into the associated recess with the tapered end ahead. To prevent the walls 3 from moving out of the respective recess/air duct D, the sensor modules 1 further comprise fastening means 6 protruding in a radial direction from an outside 3a of the respective wall 3, wherein these fastening means 6 are preferably configured as barbed hooks 6 that anchor the walls 3 in the respective recess/air duct D.

Further, according to FIG. 4f, in all embodiments, where the sensor module 1 comprises a circumferential wall 3 (e.g. FIGS. 2 to 4e), the latter does not have to be a solid wall but may also comprise one are several lateral openings 33, particularly elongated axially oriented slits, or may have a mesh form. These openings may be distributed along the periphery of the wall 3.

Furthermore, FIGS. 4g and 4h show cross sectional views of the sensor 10 attached to inside 3b in FIGS. 2 to 4f. According thereto, the sensor 10 may comprise a flow element 34 being arranged upstream of the chip 110, which flow element 34 comprises a rounded edge facing the air flow and is preferably arranged flush with the chip 110 in a direction normal to said flow or to the carrier 11 of the chip 110. However, as shown in FIG. 4h, such an element 34 can also be absent.

Further, FIG. 4i shows the protruding holding element 5 of FIGS. 2 and 3 for holding the sensors 10, 20 (comprising the carriers 11, 21 and chips 110, 120) in a plan view. Alternatively, the holding element 5 may actually extend across the channel 4 and may be fixed on both sides to the inside 3b of the wall 3 as shown in FIG. 4j.

In all embodiments shown in FIGS. 2 to 4 and 4d to 4f the sensor module 1 may comprise fastening elements 6 protruding from an outside 3a of wall 3 (which outside 3a faces away from the channel 4), which fastening elements 6 may be integrally formed with the wall 3 and are configured to engage with corresponding recesses of a surrounding material (e.g. a foam) of the seat 2.

Figure 5:
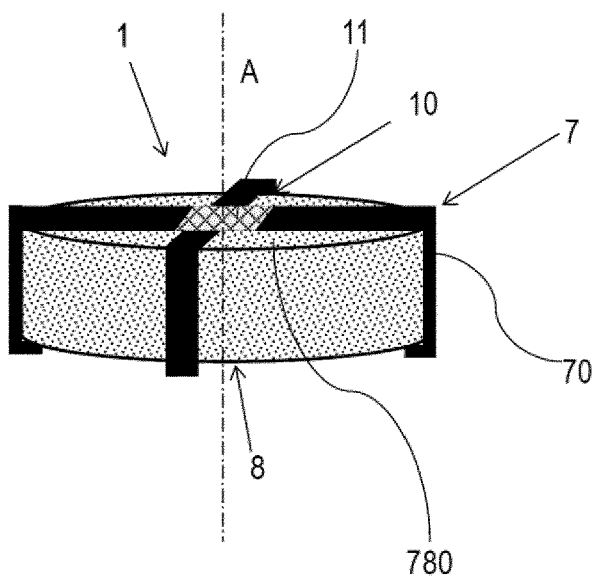
FIG. 5 shows a perspective schematical view of a further embodiment of a sensor module according to the invention, comprising a single (first) sensor for measuring relative humidity and/or temperature, which sensor is fastened to a ventilator of the automotive seat by means of a fastening means.
Figure 6:
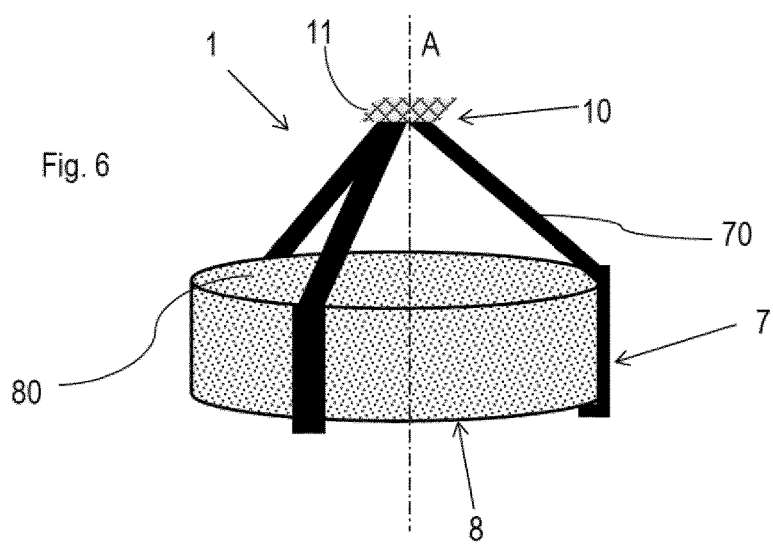
FIG. 6 shows a modification of the embodiment shown in FIG. 5.
Figure 7:
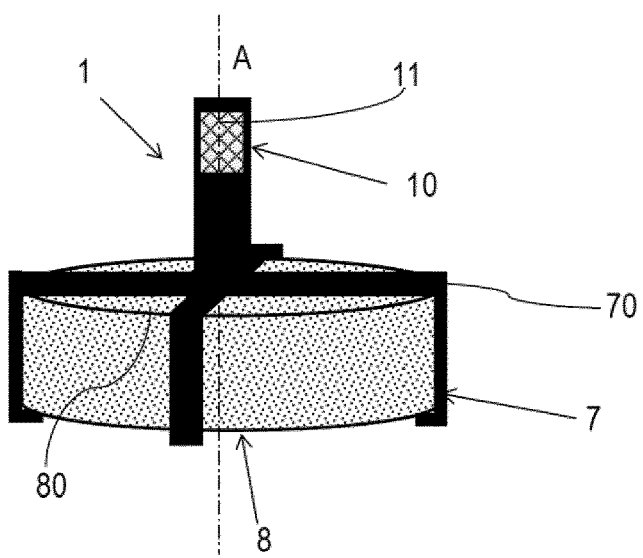
FIG. 7 shows a modification of the embodiment shown in FIG. 6.

Further, according to the embodiments shown in FIGS. 5 to 7, the sensor module 1, which here particularly merely comprises a single (first) sensor 10 configured for measuring relative humidity and/or temperature, comprises a fastening means, wherein said sensor 10 is connected to the ventilator 8 by means of this fastening means 7. Here, the ventilator 8 comprises an opening/region 80 for ejecting air or for sucking in air in an axial direction A (also denoted as axis A of the ventilator 8), wherein said axis A runs normal to an opening plane of said opening 80 or normal to said region.

According to FIG. 5, the fastening means 7 comprises a plurality of arms 70 which extend from the sensor 10 and engage behind the ventilator 8 on a side facing away from the sensor 10. In FIG. 5, the sensor 10 is arranged an said (central) axis A of the ventilator 8 in front of the opening/region 80, wherein the extension plane of the carrier or substrate of the sensor 10 extends parallel to the opening plane (i.e. perpendicular to said axis A).

FIG. 6 shows a modification of the embodiment shown in FIG. 5, wherein here the sensor 10 is oriented as in FIG. 5 but is arranged along the axis A at a distance to the ventilator 8/opening 80 of the ventilator 8. For this, the arms 70 extending from the sensor 10 are inclined with respect to the opening plane of the opening 80 of the ventilator 8.

Finally, FIG. 7 shows a modification of the sensor module 1 of FIG. 6, wherein now, the extension plane of the carrier or substrate 11 of the sensor 10 extends along the axis A, i.e. perpendicular to the opening plane of opening 80.

The embodiments according to FIGS. 5 to 7 are particularly advantageous because they allow a precise and reproducible positioning of the sensor 10 with respect to the ventilator 8 due to the fastening means 7/arms 70.

Figure 8A:
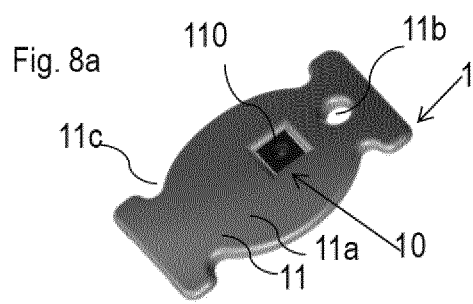
FIGS. 8a-8c show perspective views of three further embodiments of the sensor module according to the invention.
Figure 8C:
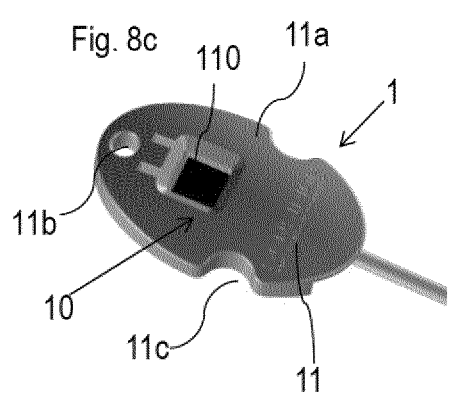
Figure 8B:
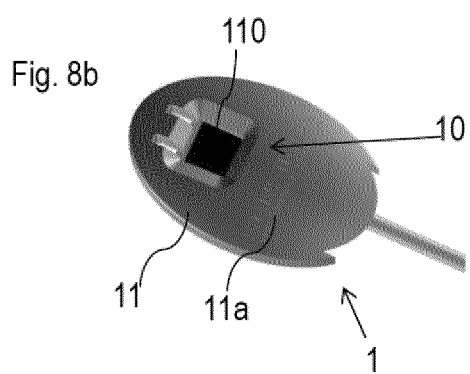

FIGS. 8a to 8c show further embodiments of the sensor module 1 according to the invention wherein here the sensor module 1 comprises a sensor 10 having a rigid carrier 11 onto which a chip 110 (e.g. CMOS) is integrated that is configured to measure temperature and/or relative humidity.

Particularly, the chip 110 is arranged in a recess formed on a surface 11a of the carrier 11, which surface preferably comprises a convex curvature.

Particularly, the carrier 11 is designed to attached to a surface/material of the seat 2 (e.g. the air distribution layer 204) with a backside facing away from said surface 11a which forms a front side of the sensor 10.

As shown in FIGS. 8a and 8c, the carrier 11 may comprise a through hole 11b (formed e.g. in an end section of the carrier 11), which is configured for sewing the carrier 11 to a seat material of the seat 2, in order to attach the carrier 11 to the seat 2. The carrier 11 may further comprise indentations 11c on an edge of the carrier 11 which may serve for fastening the carrier 11 to the seat 2, too (e.g. by wrapping an elongated flexible means around the carrier 11 such as a suture).

In contrast to the embodiments shown in FIGS. 8a to 8c, FIG. 9a shows yet another embodiment of the sensor module 1 according to the invention, wherein the sensor 10 comprising said chip 110 is attached to a carrier 11 which is a flexible carrier, e.g. out of a fabric. Here, this flexible fabric 11 is adapted to be sewn to the seat 2 (e.g. to the air distribution layer 204).

Furthermore, FIG. 9b shows a view of a modification of the embodiment shown in FIG. 9a. Here, the sensor module 1 comprises a rigid carrier 11a for carrying a chip (e.g. CMOS) 110 of the sensor 10, which is configured to measure temperature and/or relative humidity. The rigid carrier 11a is attached to a flexible support (e.g. a fabric) such that the chip 110 is not covered by the flexible support 11. Particularly, the rigid carrier 11d and the chip 110 arranged thereon extend beyond an edge 11e of the fabric. Also here, the flexible support 11 can be used to fasten the sensor module 1 to a material of the seat 2, particularly by means of sewing and/or glueing. Further, particularly, the flexible support 11/edge 11e ends at an edge of the chip 110, wherein said edge 11e of the flexible support 11 may extend parallel to said edge of the chip 110.

FIGS. 1a to 1d show different (e.g. alternative) positions of a sensor module 1 according to the invention (as e.g. shown in FIGS. 2 to 7) within an automotive seat 2 according to the invention.

According to FIGS. 1a to 1c the automotive seat 2 comprises, according to an embodiment, a seat cushion 2a on which a passenger P can take place, as well as a backrest 2b extending from the seat cushion 2a. Further, the automotive seat 2 may comprise a headrest 2c connected to the backrest 2b. Further, FIGS. 1a to 1c show detailed possible cross sections of the seat cushion 2a and backrest 2b which are in described in detail below with reference to FIG. 1d.

According to FIG. 1d the seat cushion 2a and/or the backrest 2b may be structured as follows. The automotive seat 2 (e.g. the seat cushion and/or the backrest 2b) comprise from top to bottom—wherein the top is configured to be in contact with the passenger taking place on the seat 2—a seat cover region 200 forming an outer surface 200a of the seat 2 that faces a passenger P and on which the passenger takes place or against which the passenger P rests while sitting on the automotive seat 2. According to the invention, the sensor module 1 is mounted such in said automotive seat 2 that it is spaced apart from said seat cover region 200 and thus does not affect or disturb the passenger P, i.e., due to the position of the sensor module 1, the risk that the passenger P may perceive the sensor module 1 is virtually zero.

In detail, according to an embodiment of the present invention, the seat cover 200 (also denoted as top layer) may be or comprise an air permeable layer, for instance a (thin) sheet of perforated leather or fabric, or another air permeable flexible planar formation or textile area-measured material.

Below said top layer 200 an air permeable foam backing 201 can be arranged (or alternatively any other suitable layer) which may have the color of the top layer (e.g. leather/top fabric) such that the material below the top layer 200 is not visible to the passenger P.

Further, an air permeable heating mat 202 for heating the seat 2 can be installed below the top layer 200, particularly below the form backing 201. Further, below said top layer 200, particularly below said heating mat 202 a filling material such as a foam or a fiber layer 203 can be arranged. In this filling material 203 an air duct D is preferably formed as shown in FIG. 1d.

The filling material layer (e.g. foam or fabric) 203 may also be replaced by several separate (e.g. layered) components forming said air duct D. Further, below the filling material 203 an air distribution layer 204 is preferably arranged. The air distribution layer 204 is adapted to guide air, particularly between the ducts D, D' (see below) and may also be used as a spacer.

Further, the air distribution layer 204 can have an opening or flow connection to a further air duct D' in which a ventilator 8 is located. The ventilator 8 can blow or most importantly suck air such that air flows from the passenger P through the air duct D, the air distribution layer 204, and the further air duct D' and leaves the seat 2 below the ventilator 8. In this way humidity coming from the passenger P is transported through and out of the seat 2.

The at least one temperature and/or humidity sensor 10, 20 of the sensor module 1 according to the invention is configured to record temperature and humidity data that are measures of the comfort of the seat's occupant P.

Particularly, data from the sensor module 1 is fed to a control unit 13. The control unit 13 runs an algorithm to automatically control the amount of air transported through ventilator 8 per time unit, as well as particularly the heating power of the heating mat 202, based on the signals from the sensor module 1. This enables continuous, stepless control of the seat-specific climate. Control can be fully automatic, leading to increased safety since the driver does not need to be concerned with manually adjusting the settings of the heating or ventilator 8. Further, the automatic climate control of the seat 2 can be coupled to a climate system of a vehicle (e.g. A/C) in which the seat 2 may be arranged.

According to a first embodiment shown in FIG. 1d, the sensor module 1 can be arranged in the air duct D of the seat 2 (e.g. an air duct D of the seat cushion 2a or backrest 2b) and may be formed as shown in one of the FIGS. 2 to 4j. Further, as indicated in FIG. 1db, the sensor module 1 may be arranged in the further air duct D' adjacent the ventilator 8 and may be formed as shown in one of the FIGS. 5 to 7. Further, the sensor module 1 may also be arranged in the air distribution layer 204 between the two ducts D and D' and may be formed as shown in one of the FIGS. 8a to 9.

Of course, other modifications or alternatives are also feasible.

For instance, the seat structure as show in FIGS. 1a to 1c may vary. The air duct D does not necessarily need to be formed in said material/foam 203. Other material may also be used. Further, apart from the fastening elements 6, the sensor module 1 in tube form can also be fixed to material/foam 203 using glue or glue and the fixture 6 or other fastening means described herein.

Further, the fastening elements 6 may comprise a different form or can also be absent. Further, the module 1 does not necessarily need to have a tube form, it can also be flat and fixed to side wall of an air duct D, 204, or D'.

Furthermore, the number of the arms 70 according to FIGS. 5 to 7 might vary.

Furthermore, the module 1 might be directly integrated into the ventilator 8.

Finally, the sensor 10 does not have to be placed on the axis A of ventilator 8, but may also be positioned away (offset) from said axis A.

Furthermore, according to an aspect of the present invention shown in FIG. 10, the sensor module 1 according to the invention may be used in a perspiration sensor that uses a control unit 13 that is configured to measure/determine a perspiration rate of a passenger/person P occupying the automotive seat 2. Particularly, the control unit 13 can be part of the sensor module 1 but can also be a separate control unit 13 that is not integrated into the sensor module 1. Particularly, in the embodiments described above or herein, the respective sensor module 1 can be substituted by a perspiration sensor according to the present invention.

The control unit 13 is configured to measure/determine said perspiration rate by using a relative humidity RH measured by the first sensor 10 and a relative humidity RH measured by the second sensor 20, wherein particularly the control unit 13 also uses the temperature T measured by the first sensor 10 and the temperature T measured by the second sensor 20.

Here, particularly, the first sensor 10 generates a sensor signal S1 indicative of the relative humidity RH and particularly temperature measured by the first sensor 10, and the second sensor 20 generates a sensor signal S2 indicative of the relative humidity RH and particularly temperature measured by the second sensor 20. The control unit 13 is then configured to receive said signals S1, S2 and to determine a perspiration rate using said sensor signals S1, S2 of the first and second sensor 10, 20.

For the perspiration measurement, the sensor module 1 according to the invention may comprise a channel (e.g. formed by a circumferential wall 3 or by other components), which channel 4 may end in an opening 400, which may be delimited by said wall 3 of the sensor module 1, wherein particularly said opening 400 is configured to be arranged in flow communication with a body part BP of a passenger P occupying said automotive seat 2 (for this, said opening may face said body part BP or passenger P), wherein particularly the first sensor 10 is arranged in the channel 4 at a first distance d1 from the opening 400, while the second sensor 20 is arranged in the channel 4 at a second distance d2 from the opening 400, wherein the second distance d2 is larger than the first distance d1 as indicated in FIG. 10. Therefore, a flux of vapour in the form of sweat that escapes from said body part BP of said passenger/person P can be sensed by the first and the second sensor 10, 20, wherein due to the fact that said opening 400 is in flow communication with said body part BP of the passenger/person P (cf. FIG. 10), the first sensor 10 will see an increased absolute humidity value compared to the second sensor 20, which difference can be used to determine/measure a perspiration rate.

Particularly, the control unit 13 is configured to determine as perspiration rate J a value given by the equations already stated above:

$$J = -D(T) \frac{AH_2 - AH_1}{d_{seperation}}$$

-continued $$AH = \frac{m_{H_2O}}{V} = \frac{M_{H_2O} * n}{V} = M_{H_2O} * \frac{p_{H_2O}}{R * T}$$

$$p_{H_2O} = \frac{RH}{100} * p_{sat,H2O}(T)$$

As further indicated in FIG. 10, the control unit 13 is configured to generate a control signal S3 using said measured perspiration rate J for controlling a ventilator 8 of an automotive seat 2 (e.g. as shown in FIG. 1*d*) and/or an automotive air conditioning system A/C, cf. e.g. FIG. 11.

Particularly, the sensor module 1/perspiration sensor that measures perspiration as described above may also be arranged at the positions indicated in FIG. 1*d*. Further, the opening 400 preferably faces the passenger P sitting on the seat 2. Alternatively or in addition, a distance from the passenger P/body part BP via said opening 400 to the first sensor 10 is shorter along a flow path of the sweat/vapour of the passenger P than a distance from the passenger P/body part BP via said opening 400 to the second sensor 20 along said flow path (cf. also FIG. 10). Further, in an embodiment, the seat cover region 200 of the automotive seat 2 may cover said opening 400 or may be arranged between the opening 400 and the passenger P/body part BP when the passenger P occupies the seat 2.

As illustrated in FIG. 12, perspiration is a good parameter concerning thermoregulation. Here, a person having a high perspiration rate due to physical activity (e.g. jogging) outside the motor vehicle enters a cabin of a motor vehicle and almost immediately shows a high perspiration rate. Later, after 90 min, the perspiration rate is low again. Thus, a perspiration sensor represents precisely, whether a person feels hot or cold. This can be used when adjusting temperature and/or ventilation of an automotive seat 2 as described herein, but may also be used to control an automotive air conditioning system A/C as indicated schematically in FIG. 11.

Here, the air conditioning system A/C for adjusting temperature and/or relative humidity in a cabin of a motor vehicle comprises a sensor module 1 configured for measuring perspiration as described herein. Particularly, the sensor module 1 or perspiration sensor or a separate unit provides a control signal indicative of the measured perspiration for controlling the air conditioning system A/C. This constitutes a physiological control Loop PLC. Advantageously, using the individual perspiration of a passenger P of the motor vehicle as input can control climate exactly for optimal well feeling without knowledge of the previous activity level of the passenger P. In addition, as indicated in FIG. 11, the system can comprises an environmental control loop ECL that uses temperature T and/or relative humidity RH as control signals/parameters.

The invention claimed is:

1. A perspiration sensor, comprising
a sensor module, the sensor module comprising a first sensor (10) that is designed to measure relative humidity, and a second sensor (20) that is designed to measure at least one quantity selected from the group of: relative humidity, temperature; wherein the sensor module (1) is configured to be mounted in an automotive seat (2), which automotive seat (2) comprises a seat cover region (200) forming an outer surface (200*a*) of the seat (2) that faces a passenger (P) sitting on the automotive seat (2), wherein the sensor module (1) is configured to be mounted such in said automotive seat (2) that it is spaced apart from said seat cover region (200), wherein the sensor module (1) further comprises a channel (4), wherein said first sensor (10) is arranged in said channel (4), a control unit (13) that is configured to measure a perspiration rate using a relative humidity measured by the first sensor (10) and a relative humidity measured by the second sensor (20), and wherein the channel (4) ends in an opening (400), wherein the first sensor (10) is arranged in the channel (4) at a first distance (d1) from the opening (400), and wherein the second sensor (20) is arranged in the channel (4) at a second distance (d2) from the opening (400), wherein the second distance (d2) is larger than the first distance (d1).

2. The perspiration sensor according to claim 1, characterized in that the control unit (13) is configured to generate a control signal (S3) using said measured perspiration rate for controlling at least one of: a ventilator (8) of an automotive seat (2), an automotive air conditioning system (A/C).

3. The perspiration sensor according to claim 1, characterized in that the sensor module (1) comprises the control unit (13), or that the control unit (13) is an external control unit (13) with respect to the sensor module (1).

4. The perspiration sensor according to claim 1, characterized in that the first sensor (10) is designed to also measure temperature.

5. The perspiration sensor according to claim 1, characterized in that the sensor module (1) comprises a circumferential wall (3) that surrounds the channel (4) of the sensor module (1).

6. The perspiration sensor according to claim 5, characterized in that the first sensor (10) is attached to an inside (3b) of said wall (3) or that the first sensor (10) is attached to a holding element (5) that protrudes from an inside (3b) of said wall (3) into said channel (4).

7. The perspiration sensor according to claim 5, characterized in that the second sensor (20) is attached to an inside (3b) of said wall (3) or to a holding element (5) that protrudes from said inside (3b) of said wall (3) into said channel (4).

8. The perspiration sensor according to claim 5, characterized in that the sensor module (1) comprises at least one fastening element (6) which protrudes from an outside (3a) of said wall (3), wherein said at least one fastening element (6) is configured to engage in a form-fitting manner into a recess in a filling material (203) of the automotive seat (2) which material (203) surrounds said wall (3) of the sensor module (1).

9. An automotive seat (2), comprising a perspiration sensor according to claim 1.

* * * * *